(12) United States Patent
Funatsu et al.

(10) Patent No.: US 12,335,611 B2
(45) Date of Patent: Jun. 17, 2025

(54) ELECTRONIC DEVICE AND METHOD FOR CONTROLLING THE SAME

(71) Applicant: CANON KABUSHIKI KAISHA, Tokyo (JP)

(72) Inventors: Yoshihiro Funatsu, Kanagawa (JP); Koki Kitaya, Kanagawa (JP); Junko Morikawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 18/156,271

(22) Filed: Jan. 18, 2023

(65) Prior Publication Data

US 2023/0156326 A1 May 18, 2023

Related U.S. Application Data

(63) Continuation of application No. PCT/JP2021/025771, filed on Jul. 8, 2021.

(30) Foreign Application Priority Data

Jul. 22, 2020 (JP) .................................. 2020-125165
Jul. 22, 2020 (JP) .................................. 2020-125166

(51) Int. Cl.
*H04N 23/667* (2023.01)
*H04N 23/45* (2023.01)
(Continued)

(52) U.S. Cl.
CPC .......... *H04N 23/667* (2023.01); *H04N 23/45* (2023.01); *H04N 23/632* (2023.01); *H04N 23/69* (2023.01); *H04N 23/90* (2023.01)

(58) Field of Classification Search
None
See application file for complete search history.

(56) References Cited

U.S. PATENT DOCUMENTS

| 2013/0235234 A1* | 9/2013 | Cucci | ..................... H04N 5/907 |
| | | | 348/E5.031 |
| 2017/0099430 A1* | 4/2017 | Fukui | ..................... H04N 23/45 |

(Continued)

FOREIGN PATENT DOCUMENTS

| CN | 205545654 U | 8/2016 |
| JP | 2004312583 A | 11/2004 |

(Continued)

*Primary Examiner* — Paul M Berardesca
(74) *Attorney, Agent, or Firm* — Canon U.S.A., Inc., IP Division

(57) ABSTRACT

A first image capturing unit (203 to 205) configured to capture an image using a lens placed on a first surface, a second image capturing unit (201 and 202) configured to capture an image using a lens placed on a second surface, the second image capturing unit being configured to switch to first image capturing using a first lens and second image capturing using a second lens with a wider angle than an angle of view of the first lens, and a control unit configured to perform control to, during the image capturing by the second image capturing unit, in response to a user operation for changing from a still image capturing mode to a moving image capturing mode, switch to the moving image capturing mode and also switch from the first image capturing using the first lens to the second image capturing using the second lens, are included.

12 Claims, 8 Drawing Sheets

(51) Int. Cl.
*H04N 23/63* (2023.01)
*H04N 23/69* (2023.01)
*H04N 23/90* (2023.01)

(56) References Cited

U.S. PATENT DOCUMENTS

| | | | | |
|---|---|---|---|---|
| 2023/0156325 A1* | 5/2023 | Ogawa | ............... | G06F 1/1686 |
| | | | | 348/220.1 |
| 2023/0164435 A1* | 5/2023 | Takahashi | ............ | H04N 23/60 |
| | | | | 348/220.1 |
| 2023/0188826 A1* | 6/2023 | Wu | ..................... | H04N 23/80 |
| | | | | 348/222.1 |

FOREIGN PATENT DOCUMENTS

| | | | |
|---|---|---|---|
| JP | 2008092013 | A | 4/2008 |
| JP | 2012222471 | A | 11/2012 |
| JP | 2015126390 | A | 7/2015 |
| JP | 2017017376 | A | 1/2017 |
| JP | 2017085339 | A | 5/2017 |
| JP | 2019207343 | A | 12/2019 |
| WO | 2017200049 | A1 | 11/2017 |
| WO | 2019234877 | A1 | 12/2019 |

\* cited by examiner

DISPLAY SCREEN FOR STANDARD REAR CAMERA (PHOTOGRAPH (STILL IMAGE) MODE)

DISPLAY SCREEN FOR WIDE-ANGLE REAR CAMERA (PHOTOGRAPH (STILL IMAGE) MODE)

DISPLAY SCREEN FOR ULTRA WIDE-ANGLE REAR CAMERA (PHOTOGRAPH (STILL IMAGE) MODE)

DISPLAY SCREEN FOR STANDARD REAR CAMERA (MOVING IMAGE MODE)

DISPLAY SCREEN FOR STANDARD FRONT CAMERA (PHOTOGRAPH (STILL IMAGE) MODE)

DISPLAY SCREEN FOR WIDE-ANGLE FRONT CAMERA (PHOTOGRAPH (STILL IMAGE) MODE)

DISPLAY SCREEN FOR STANDARD FRONT CAMERA (MOVING IMAGE MODE)

FIG.6

| REAR CAMERAS | → | FRONT CAMERAS |
|---|---|---|
| STANDARD REAR CAMERA | → | STANDARD FRONT CAMERA |
| WIDE-ANGLE REAR CAMERA | → | WIDE-ANGLE FRONT CAMERA (ELECTRONIC ZOOM) |
| ULTRA WIDE-ANGLE REAR CAMERA | → | WIDE-ANGLE FRONT CAMERA |

| FRONT CAMERAS | → | REAR CAMERAS |
|---|---|---|
| STANDARD FRONT CAMERA | → | STANDARD REAR CAMERA |
| WIDE-ANGLE FRONT CAMERA (ELECTRONIC ZOOM) | → | WIDE-ANGLE REAR CAMERA |
| WIDE-ANGLE FRONT CAMERA | → | ULTRA WIDE-ANGLE REAR CAMERA |

ELECTRONIC DEVICE AND METHOD FOR CONTROLLING THE SAME

CROSS-REFERENCE TO RELATED APPLICATIONS

This application is a Continuation of International Patent Application No. PCT/JP2021/025771, filed Jul. 8, 2021, which claims the benefit of Japanese Patent Applications No. 2020-125166, filed Jul. 22, 2020, and No. 2020-125165, filed Jul. 22, 2020, all of which are hereby incorporated by reference herein in their entirety.

BACKGROUND OF THE INVENTION

Field of the Invention

The present invention relates to an electronic device and a method for controlling the same, and in particular, relates to an electronic device including a plurality of lenses as lenses for image capturing.

Background Art

In an electronic device such as a smartphone, not only is a rear camera provided on the back surface side, but also a front camera is provided on the front surface side where a display screen is provided, whereby a user using the electronic device can capture an image of him- or herself. In patent literature (PTL) 1, two cameras, namely a first camera and a second camera capable of capturing a wider angle than the first camera, are provided as rear cameras on the back surface side.

CITATION LIST

Patent Literature

PTL 1: Japanese Patent Application Laid-Open No. 2017-85339

In PTL 1, while a plurality of cameras having different angles of view is provided as the rear cameras on the back surface side, a single front camera is provided on the front surface side. Thus, an image capturing function of the front camera is inferior to those of the rear cameras. To improve the function of the front camera, if a plurality of cameras is provided as front cameras, and if image capturing by the front cameras is performed, a user has to perform an operation to switch to a camera to use among the plurality of cameras to perform the image capturing. This increases trouble for a user.

In view of the above issue, the present invention is directed to, in an electronic device including a first image capturing unit configured to capture an image using a lens placed on a first surface, and a second image capturing unit configured to capture an image using a lens placed on a second surface and configured to switch to first image capturing using a first lens and second image capturing using a second lens having a wider angle of view than an angle of view of the first lens, appropriately controlling the switch to the first image capturing and the switch to the second image capturing depending on an operating state of the electronic device or an operation of a user.

SUMMARY OF THE INVENTION

Particularly, the present invention is directed to providing an electronic device that, in response to a switch between image capturing modes or a switch from image capturing by a first image capturing unit to image capturing by a second image capturing unit, switches to image capturing at an appropriate angle of view.

According to an aspect of the present invention, an electronic device including a first surface and a second surface includes a first image capturing unit configured to capture an image using a lens placed on the first surface, a second image capturing unit configured to capture an image using a lens placed on the second surface, the second image capturing unit being configured to switch to first image capturing using a first lens and second image capturing using a second lens having a wider angle of view than an angle of view of the first lens, and a control unit configured to perform control to, during the image capturing by the second image capturing unit, in response to a user operation for changing from a still image capturing mode to a moving image capturing mode, switch to the moving image capturing mode and also switch from the first image capturing using the first lens to the second image capturing using the second lens.

According to another aspect of the present invention, an electronic device including a first surface and a second surface includes a first image capturing unit configured to capture an image using a lens placed on the first surface, a second image capturing unit configured to capture an image using a lens placed on the second surface, the second image capturing unit being configured to switch to first image capturing using a first lens placed on the second surface and second image capturing using a second lens placed on the second surface and having a wider angle of view than an angle of view of the first lens, and a control unit configured to, in a case where the image capturing by the first image capturing unit is switched to the image capturing by the second image capturing unit, then depending on an angle of view of the image capturing by the first image capturing unit, control whether to switch to the first image capturing using the first lens or switch to the second image capturing using the second lens.

Further features of the present invention will become apparent from the following description of exemplary embodiments with reference to the attached drawings.

BRIEF DESCRIPTION OF THE DRAWINGS

The attached drawings are included in the specification, constitute a part of the specification, illustrate exemplary embodiments of the present invention, and are used to describe the principle of the present invention together with the descriptions of the exemplary embodiments.

FIG. 6 is a diagram illustrating correspondence relationships between rear cameras and front cameras.

DESCRIPTION OF THE EMBODIMENTS

With reference to the drawings, suitable exemplary embodiments of the present invention will be described below. While the description is given using a smartphone as an example of an electronic device, the present invention may be implemented by a digital camera, a tablet, a gaming console, or another mobile terminal.

External Appearance of Smartphone 100

Figure 1A:
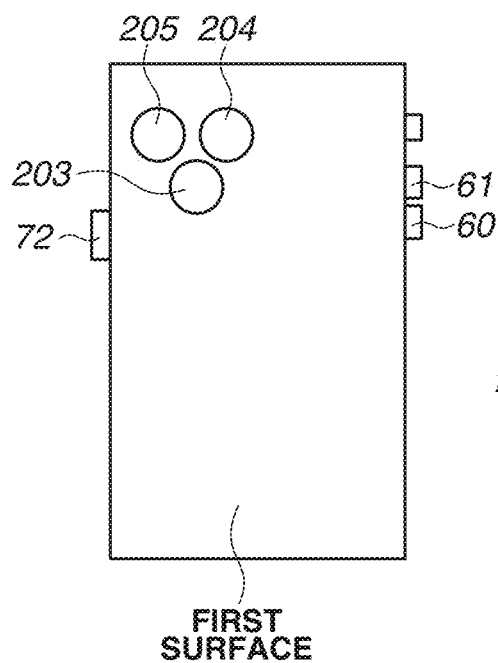
FIG. 1A is an external view of a smartphone 100.
Figure 1B:
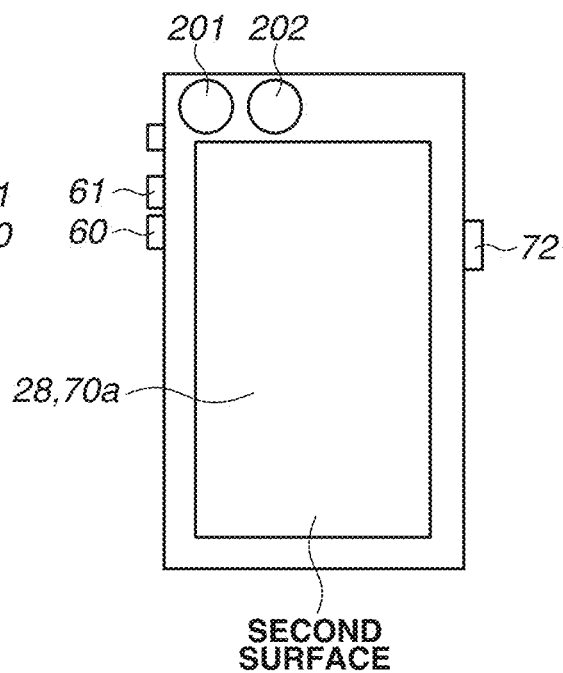
FIG. 1B is an external view of the smartphone 100.
Figure 1C:
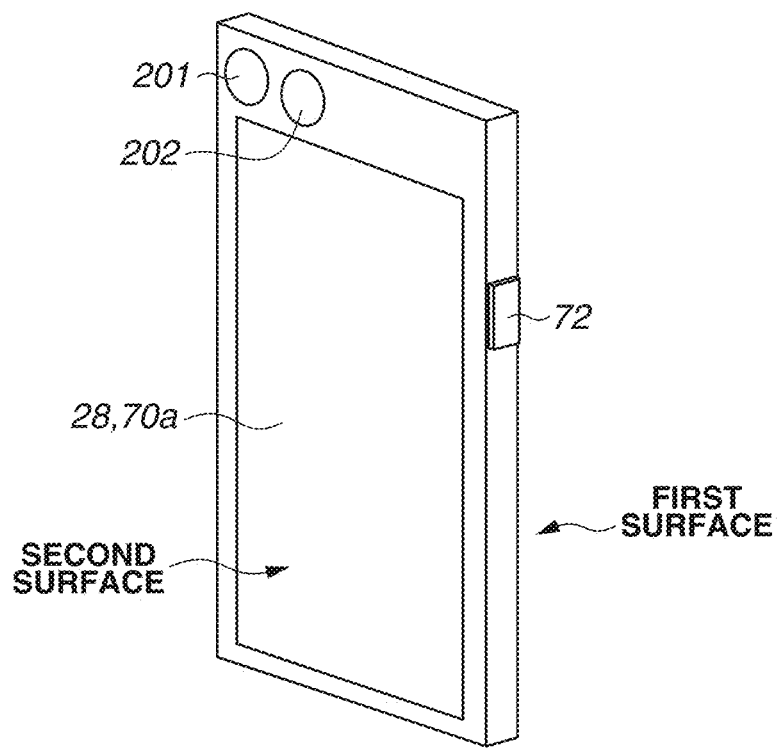
FIG. 1C is an external view of the smartphone 100.

FIGS. 1A, 1B, and 1C are external views of a smartphone 100. As illustrated in FIG. 1C, a surface of the smartphone 100 on which a touch panel-type display screen (28, 70a) is placed is referred to as a "second surface", and a surface of the smartphone 100 on the opposite side thereof is referred to as a "first surface". FIG. 1A is an external view of the first surface, which is a back surface on the opposite side of the display screen of the smartphone 100. FIG. 1B is an external view of the second surface, which is on the display screen side of the smartphone 100.

A display unit (display screen) 28 is a display unit that displays an image and various pieces of information. The display unit 28 includes a touch panel 70a capable of detecting a touch operation on the display unit 28. An up key 61 is a button with which an instruction to increase a sound volume or an image capturing instruction can be given. A down key 60 is a button with which an instruction to decrease the sound volume can be given or an instruction to record an image displayed on the display unit 28 can be given by being simultaneously pressed down together with a power switch 72. The power switch 72 is a push button for switching the power on and off. On the first surface, which is on the side where the smartphone 100 does not have the display unit 28, three camera units are placed. On the second surface, which is on the side where the smartphone 100 has the display unit 28, two camera units are placed. The camera units placed on each of the surfaces are different from each other in focal length and therefore are different from each other in the size of the angle of view that can be captured. On the first surface, camera units 203, 204, and 205 are placed. On the second surface, camera units 201 and 202 are placed. The camera units 203, 204, and 205 placed on the first surface are referred to as "rear cameras". The camera units 201 and 202 placed on the second surface are referred to as "front cameras". As described above, the smartphone 100 includes two image capturing units, namely the rear cameras and the front cameras. A user can switch between image capturing by the image capturing unit on the first surface (the rear cameras) and image capturing by the image capturing unit on the second surface (the front cameras). In general, the user operates the smartphone 100 while checking display, and therefore, the user is on the display unit 28 side. Then, the user switches to image capturing using the camera units placed on the second surface (the front cameras) and thereby can capture an image including the user him- or herself holding the smartphone 100. When the image capturing is performed, the user can perform the image capturing while checking an image (a live view image) that is being captured on the display unit 28 placed on the second surface.

Configuration of Smartphone

Figure 2:
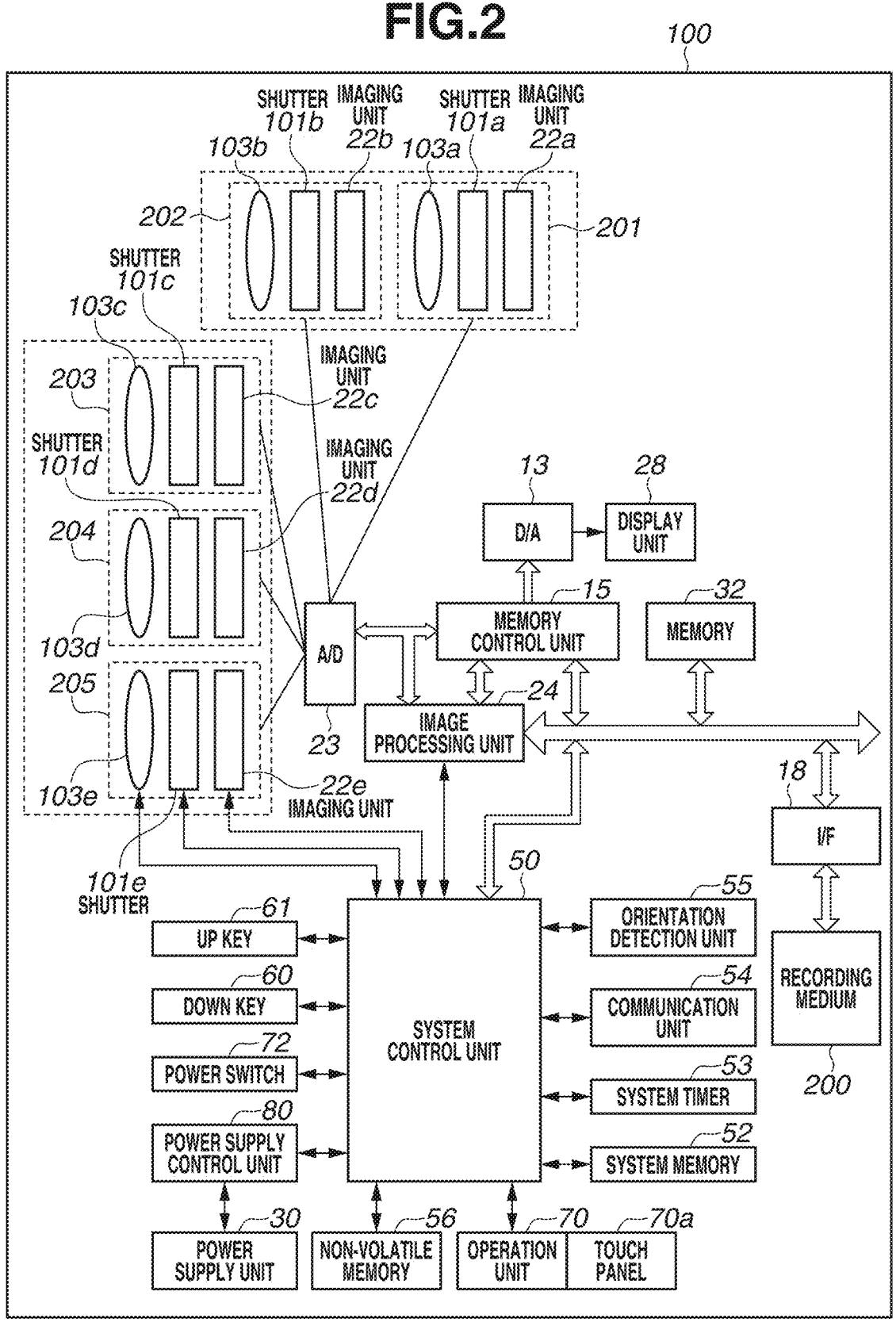
FIG. 2 is a block diagram of the smartphone 100.

FIG. 2 is a block diagram illustrating an example of the configuration of the smartphone 100 according to the present exemplary embodiment.

The smartphone 100 includes the camera units 201 to 205. The camera units 201 and 202 are placed on the second surface, and the camera units 203, 204, and 205 are placed on the first surface. Lenses 103a to 103e indicate lenses included in the respective camera units. While some of the camera units include a plurality of lenses, for simplicity, FIG. 2 illustrates only a single lens for each camera unit.

The camera unit 201 is a standard camera including a standard lens 103a. The camera unit 202 is a wide-angle camera including a wide-angle lens 103b. In a case where the camera unit 202 is used, it is possible to capture an image with a wider angle of view than in a case where the camera unit 201 is used. The camera unit 203 is a standard camera including a standard lens 103c. The camera unit 204 is a wide-angle camera including a wide-angle lens 103d. The camera unit 205 is an ultra wide-angle camera including an ultra wide-angle lens 103e. Thus, the camera unit 204 can capture an image with a wider angle of view than the camera unit 203. The camera unit 205 can capture an image with a wider angle of view than the camera unit 204.

Shutters 101a to 101e are each a shutter having a diaphragm function. Imaging units 22a to 22e are each an image sensor composed of a charge-coupled device (CCD) or a complementary metal-oxide-semiconductor (CMOS) device, which converts an optical image into an electric signal. An analog-to-digital (A/D) converter 23 is used to convert an analog signal output from each of the imaging units 22a to 22e into a digital signal.

Each of the imaging units 22a to 22e is an image sensor composed of a CCD or a CMOS, which converts an optical image into an electric signal. The camera units 201 to 205 photoelectrically convert object images formed on the imaging units 22a to 22e through the lenses 103a to 103e, respectively, and output the resulting images to the A/D converter 23. The A/D converter 23 converts an analog signal into a digital signal. Data converted into a digital signal is output to an image processing unit 24, or may be temporarily stored in a memory 32.

The image processing unit 24 performs predetermined processes including a pixel interpolation process, resizing process such as reduction, and a color conversion process on data from the A/D converter 23 or data from a memory control unit 15. The image processing unit 24 performs a predetermined calculation process using captured image data. A system control unit 50 performs exposure control and distance measurement control based on an obtained calculation result. Consequently, an autofocus (AF) process, an automatic exposure (AE) process, and a flash pre-emission (EF) process are performed by a through-the-lens (TTL) method. The image processing unit 24 further performs a predetermined calculation process using captured image data and performs an auto white balance (AWB) process by the TTL method based on the obtained calculation result. As a process when image data is recorded, the image processing unit 24 also performs an image compression process.

Output data from the A/D converter 23 is written directly to the memory 32 via the image processing unit 24 and the memory control unit 15 or via the memory control unit 15. The memory 32 stores image data obtained by each of the imaging units 22a to 22e and converted into digital data by the A/D converter 23 and image data to be displayed on the display unit 28. The memory 32 has a sufficient storage capacity for storing a predetermined number of still images, and a moving image and audio of a predetermined length of time.

The memory 32 also serves as a memory for image display (a video memory). A digital-to-analog (D/A) converter 13 converts data for image display stored in the memory 32 into an analog signal and supplies the analog signal to the display unit 28. Consequently, image data for display written in the memory 32 is displayed on the display unit 28 via the D/A converter 13. The display unit 28 performs display on a display device such as a liquid crystal display (LCD) based on the analog signal from the D/A converter 13. Analog signals are once converted into digital signals by the A/D converter 23, and the digital signals are accumulated in the memory 32 and converted into analog signals by the D/A converter 13. Then, the analog signals are sequentially transferred to and displayed on the display unit 28, whereby the display unit 28 functions as an electronic viewfinder and can perform live view image display (live view display).

A power supply control unit 80 includes a battery detection circuit, a direct-current-to-direct-current (DC/DC) converter, and a switch circuit for switching blocks to which a current is applied. The power supply control unit 80 detects the presence or absence of an attached battery, the type of battery, and the remaining life of the battery. The power supply control unit 80 controls the DC/DC converter based on the detection results and an instruction from the system control unit 50 and supplies a required voltage to components including a recording medium 200 for a required period. If the power switch 72 is held down (continuously pressed for a predetermined time, such as 2 seconds or 3 seconds, or more), it is possible to switch on and off of the smartphone 100 power supply. If the power switch 72 is pressed for a short period less than the predetermined time, the smartphone 100 can transition to a power saving mode and return from the power saving mode, and display on the display unit 28 can be switched between a hidden state and a displayed state.

A power supply unit 30 includes a primary battery such as an alkaline battery or a lithium battery, a secondary battery such as a nickel-cadmium (NiCd) battery, a nickel-metal hydrate (NiMH) battery, or a lithium-ion (Li) battery, or an alternating current (AC) adapter.

A recording medium interface (recording medium I/F) 18 is an interface with the recording medium 200 such as a memory card or a hard disk. The recording medium 200 is a recording medium such as a memory card for recording a captured image, downloaded music, and a video, and is composed of a semiconductor memory or a magnetic disk.

A communication unit 54 performs a wireless connection or a wired connection, and transmits and receives a video signal and an audio signal. The communication unit 54 can also connect to the Internet via a mobile phone communication system or a wireless local area network (LAN). The communication unit 54 can transmit an image (including a live view image) captured by each of the imaging units 22a to 22e or an image stored in the recording medium 200 and also receive image data or various other pieces of information from an external device.

An orientation detection unit 55 detects the orientation of the smartphone 100 relative to the direction of gravity. Based on the orientation detected by the orientation detection unit 55, it is possible to determine whether an image captured by each of the imaging units 22a to 22e is an image captured with the smartphone 100 held horizontally or an image captured with the smartphone 100 held vertically. The system control unit 50 can add orientation information based on the orientation detected by the orientation detection unit 55 to an image file of an image captured by each of the imaging units 22a to 22e or store the image by rotating the image. As the orientation detection unit 55, an acceleration sensor or a gyro sensor can be used.

A system timer 53 is a time measurement unit that measures the time used for various types of control and the time of a built-in clock.

The up key 61, the down key 60, the power switch 72, and an operation unit 70 are operation units for inputting various operation instructions to the system control unit 50.

A system memory 52 is, for example, a random-access memory (RAM). The system control unit 50 reads a constant and a variable for operation of the system control unit 50, and a program from a non-volatile memory 56 and loads the constant, the variable, and the program into the system memory 52.

The non-volatile memory 56 is a memory from and in which data can be electrically erased and recorded by the system control unit 50. As the non-volatile memory 56, for example, an Electrically Erasable Programmable Read-Only Memory (EEPROM) is used. The non-volatile memory 56 stores a constant for the operation of the system control unit 50 and a program. The "program" as used herein includes a program for executing various flowcharts described below in the present exemplary embodiment.

The system control unit 50 includes at least one built-in processor and controls the entire smartphone 100. The system control unit 50 executes the program recorded in the above-described non-volatile memory 56, thereby implementing processes described below in the present exemplary embodiment. Further, the system control unit 50 controls the image processing unit 24, the memory control unit 15, the memory 32, the D/A converter 13, and the display unit 28, thereby performing display control for controlling the above-described display of the live view image or a captured image recorded in the recording medium 200 and the display of various setting screens and setting values on the display unit 28.

The operation unit 70 includes the touch panel 70a capable of detecting a touch operation, and a switch for switching to a silent mode. Further, the operation unit 70 also includes the up key 61, the down key 60, and the power switch 72. Through the operation unit, the user can perform an operation on the smartphone, such as changing an image capturing mode or an image capturing setting (an image capturing condition), giving an image capturing instruction, or giving an instruction to execute a camera function.

Figure 3:
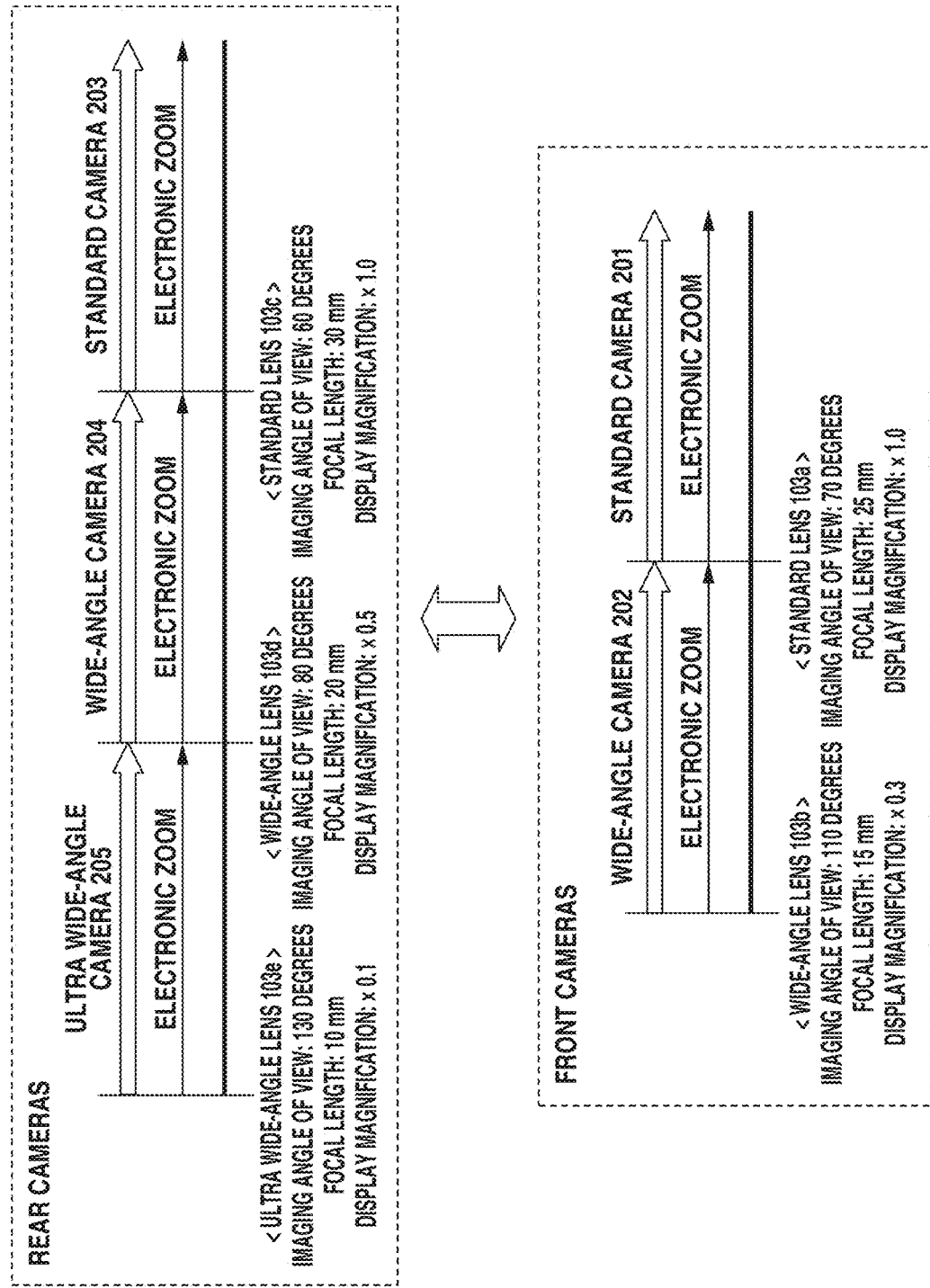
FIG. 3 is a diagram illustrating an image-taking angle of view and a focal length of each camera unit.

Next, with reference to FIG. 3, an image-taking angle of view and the focal length of each camera unit of the smartphone 100 are described. FIG. 3 is a diagram illustrating the image-taking angle of view and the focal length of each camera unit.

On the first surface, the camera units 203 to 205 are placed as the rear cameras. The ultra wide-angle lens 103e of the camera unit (ultra wide-angle camera) 205 has a focal length of 10 mm and an image-taking angle of view of 130 degrees. The wide-angle lens 103d of the camera unit (wide-angle camera) 204 has a focal length of 20 mm and an image-taking angle of view of 80 degrees. The standard lens 103c of the camera unit (standard camera) 203 has a focal length of 30 mm and an image-taking angle of view of 60 degrees. On the second surface, the camera units 201 and 202 are placed as the front cameras. The wide-angle lens 103b of the camera unit (wide-angle camera) 202 has a focal length of 15 mm and an image-taking angle of view of 110 degrees. The standard lens 103a of the camera unit (standard camera) 201 has a focal length of 25 mm and an image-taking angle of view of 70 degrees.

Among the rear cameras, the ultra wide-angle camera 205 can capture the image-taking angle of view of 130 degrees. If the user gives an instruction to change the angle of view, and the specified image-taking angle of view is smaller than 130 degrees and greater than 80 degrees, electronic zoom is performed on an image captured by the ultra wide-angle camera 205 to narrow the image-taking angle of view. If the image-taking angle of view specified by the user reaches an image-taking angle of view of 80 degrees, a switch is made to image capturing by the wide-angle camera 204. Conversely, during image capturing at an image-taking angle of view of 80 degrees or less using the wide-angle camera 204, if the user gives an instruction to change the image-taking angle of view to 80 degrees or more, a switch is made to image capturing by the ultra wide-angle camera 205, and electronic zoom to obtain the image-taking angle of view is performed. If the image-taking angle of view specified by the user to the wide-angle camera 204 is smaller than 80 degrees and greater than 60 degrees, electronic zoom is performed on an image captured by the wide-angle camera 204 to narrow the image-taking angle of view. If the image-taking angle of view specified by the user reaches 60 degrees, a switch is made to image capturing by the standard camera 203. Conversely, during image capturing by the standard camera 203, if the image-taking angle of view specified by the user reaches 60 degrees or more, a switch is made to image capturing by the wide-angle camera 204, and electronic zoom to obtain the image-taking angle of view is performed. A method for specifying the image-taking angle of view will be described below.

As described above, if the user gives an instruction to change the image-taking angle of view, electronic zoom is used, and if the user gives an instruction to change the image-taking angle of view to an image-taking angle of view at which image capturing by another camera unit is appropriate, a camera unit to perform the image capturing is switched.

Similarly, in the case of the second surface, the wide-angle camera 202 can capture an image-taking angle of view of 110 degrees. If the image-taking angle of view specified by the user is smaller than 110 degrees and greater than 70 degrees, electronic zoom is performed on an image captured by the wide-angle camera 202 to narrow the image-taking angle of view. If the image-taking angle of view specified by the user reaches 70 degrees, a switch is made to image capturing by the standard camera 201. If the image-taking angle of view specified by the user is smaller than 70 degrees, electronic zoom is performed on an image captured by the standard camera 201 to narrow the image-taking angle of view. During image capturing by the standard camera 201, if the image-taking angle of view specified by the user becomes greater than 70 degrees, a switch is made to image capturing by the wide-angle camera 202, and electronic zoom to obtain the image-taking angle of view is performed.

While each lens has a single focus in the present exemplary embodiment, a configuration may be employed in which the position of each lens is movable and optical zoom can be performed.

Processing Flow of Camera Function

Figure 4A:
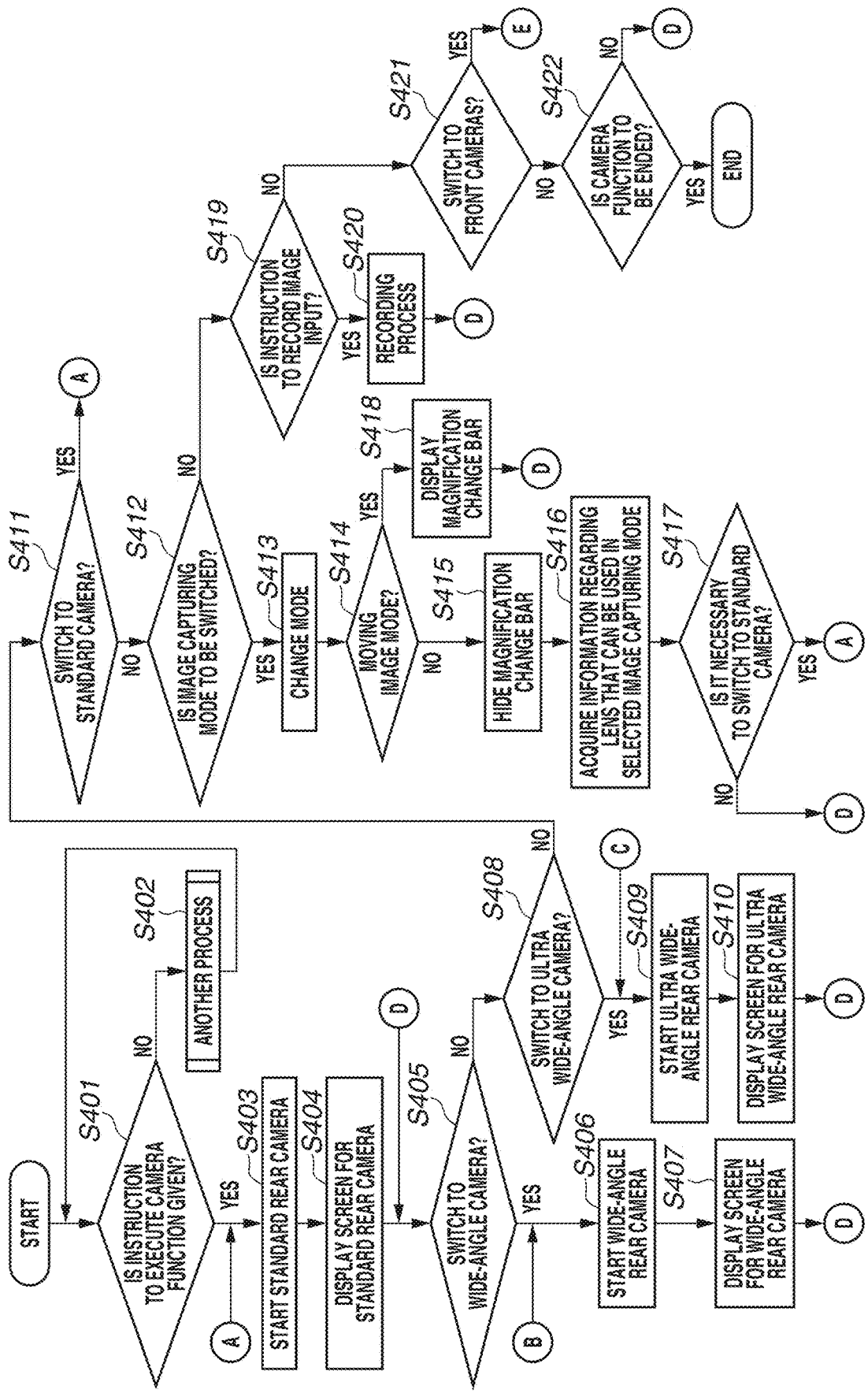
FIG. 4A is a flowchart illustrating processing when a camera function of the smartphone 100 is executed.
Figure 4B:
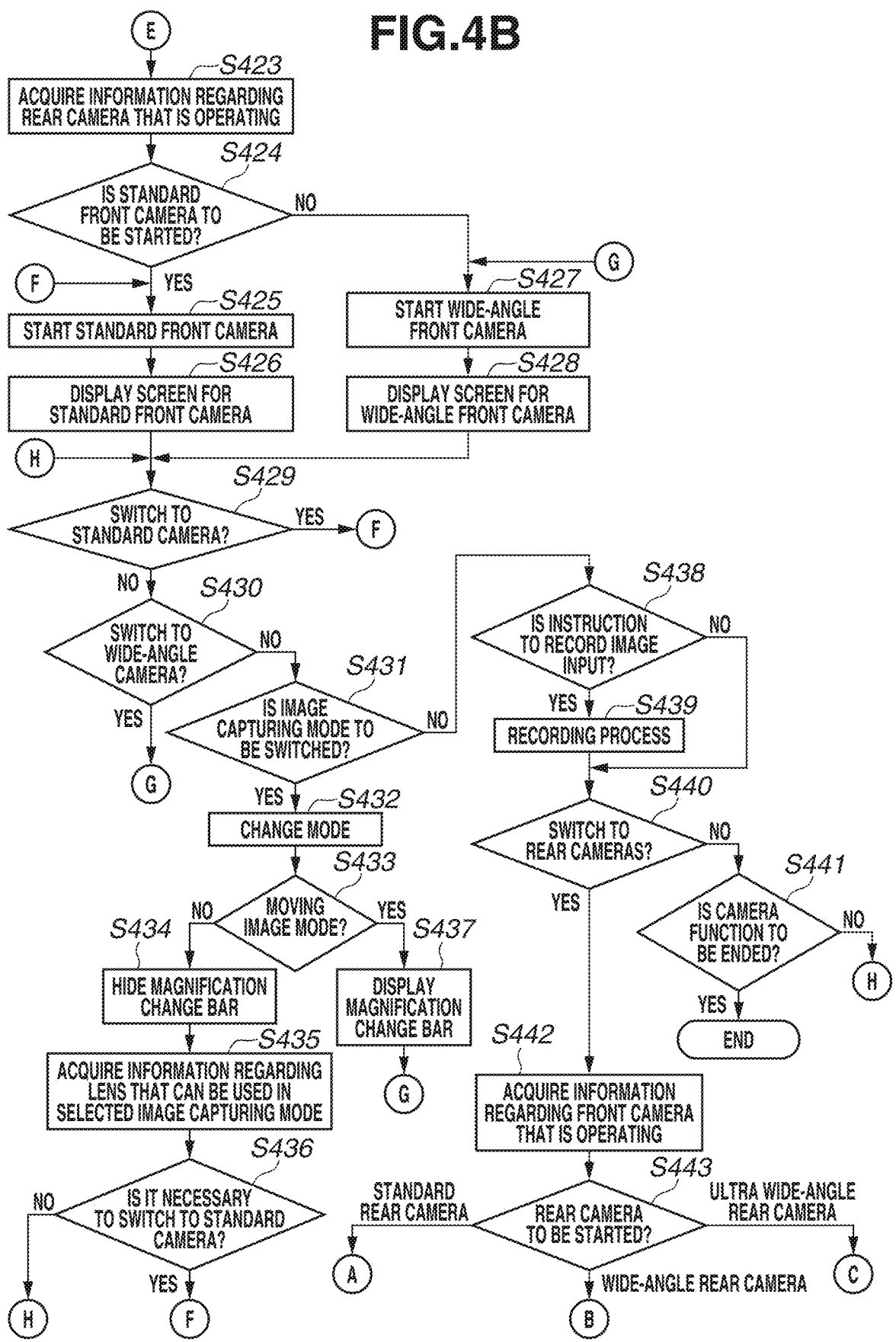
FIG. 4B is a flowchart illustrating processing when the camera function of the smartphone 100 is executed.

Next, with reference to flowcharts in FIGS. 4A and 4B, a description is given of processing when the camera function of the smartphone 100 is executed.

First, in step S401, the system control unit 50 determines whether an operation by the user on the operation unit 70 is an instruction to execute the camera function of the smartphone 100. If an instruction to execute the camera function is given, the processing proceeds to step S403. If an instruction is other than the instruction to execute the camera function, the processing proceeds to step S402.

In step S402, the system control unit 50 executes a process corresponding to the operation by the user. Also during or after the execution of this process, the system control unit 50 determines whether an instruction to execute the camera function of step S401 is given.

In step S403, the system control unit 50 starts the camera unit (standard rear camera) 203, which is the rear camera including the standard lens 103c. Then, in step S404, the system control unit 50 displays a display screen for the standard rear camera including a live view image captured by the standard rear camera 203 and various display items on the display unit 28. The display of the screen for the standard rear camera including the live view image captured by the standard camera 203 continues until a switch is made to another camera.

Figure 5A:
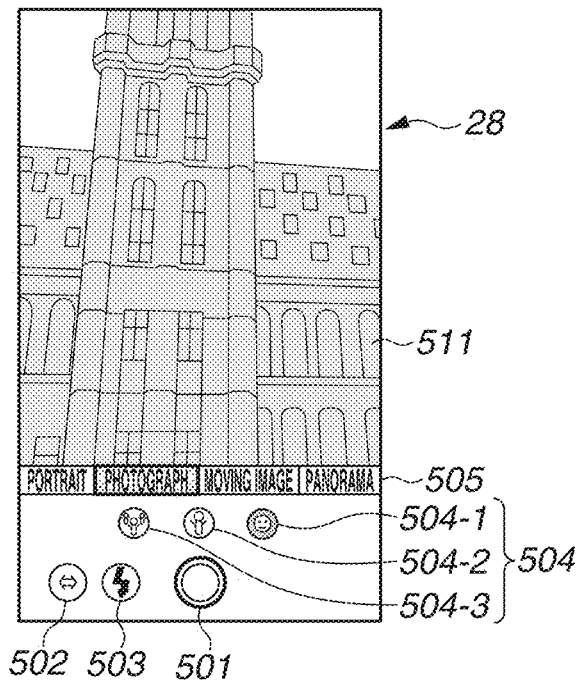
FIG. 5A is an example of display when the camera function of the smartphone 100 is executed.

FIG. 5A is an example of display of the display screen for the standard rear camera that is displayed when the standard camera 203 among the rear cameras (the standard rear camera) is operating. In the example of display in FIG. 5A, display items such as an image capturing button 501, a rear camera/front camera switch button 502, a flash setting icon 503, angle-of-view switch icons 504, and image capturing mode settings 505 are displayed together with a live view image 511.

The live view image 511 is captured by the standard camera 203. By performing a touch operation on the live view image, the user can change the angle of view of the live view image displayed on the display unit 28. The user can change the angle of view by simultaneously touching a plurality of places (e.g., two points) and performing a pinch-in operation in which the touch positions are brought close to each other, or a pinch-out operation in which the touch positions are separated from each other. While not illustrated in FIG. 4A, if the system control unit 50 detects a pinch-in operation on the live view image, the system control unit 50 makes the angle of view of the live view image wider (greater) in response to the pinch-in operation, thereby reducing the live view image. Then, if the system control unit 50 detects a pinch-out operation, the system control unit 50 makes the angle of view of the live view image narrower (smaller), thereby enlarging the live view image. In response to a pinch-in operation or a pinch-out operation, the system control unit 50 changes the angle of view of the live view image in a range where the angle of view can be changed. As described with reference to FIG. 3, in response to a pinch-in operation or a pinch-out operation, the system control unit 50 changes the angle of view of the live view image by performing an electronic zoom process and switching between the camera units.

The image capturing button 501 is a button for giving an instruction to record a captured image. If the user operates (touches) the button 501, a recording process for recording the captured image is performed.

The rear camera/front camera switch button 502 is a button for switching between image capturing by the rear cameras and image capturing by the front cameras. During image capturing by (during the operations of) the rear cameras, if the user operates (touches) the button 502, a switch is made to image capturing by the front cameras. During image capturing by the front cameras, if the user operates (touches) the button 502, a switch is made to image capturing by the rear cameras.

The flash setting icon 503 is an icon indicating the current flash image capturing setting. In FIG. 5A, the flash setting icon 503 indicates that forced light emission is set as the flash image capturing setting. The user can change the flash image capturing setting to another setting (e.g., auto, red-eye reduction, or off) by operating (touching) the icon 503.

The angle-of-view switch icons 504 include a standard icon 504-1, a wide-angle icon 504-2, and an ultra wide-angle icon 504-3. The user can switch among image capturing by the standard camera, image capturing by the wide-angle camera, and image capturing by the ultra wide-angle camera by operating (touching) any of these icons. In FIG. 5A, since the image capturing by the standard camera is performed, the standard icon 504-1 is displayed in a selected state (displayed in a different color or with a selection frame). If the angle-of-view switch icons 504 are operated, the system control unit 50 switches to image capturing by a corresponding camera unit and outputs an image (displays a live view image) without performing electronic zoom. Thus, it is possible to greatly change the angle of view by a single operation of the angle-of-view switch icons 504.

In the image capturing mode settings 505, buttons corresponding to a plurality of image capturing modes that can be set by the camera function are displayed in a line. In the present exemplary embodiment, a photograph (still image) capturing mode, a moving image capturing mode, a panoramic image capturing mode, and a portrait image capturing mode can be set. In FIG. 5A, a button corresponding to the photograph (still image) capturing mode is displayed in the selected state (displayed in a different color or with a selection frame) so that it can be understood that the currently set image capturing mode is the photograph (still image) capturing mode. As described above, display items for making an image capturing setting and giving an image capturing instruction are displayed together with the live view image on the display unit 28 under the display control by the system control unit 50.

In the present exemplary embodiment, if the camera function is executed, first, the standard rear camera is selected and caused to operate in the photograph capturing mode (the still image capturing mode). Thus, in the flowchart in FIG. 4A, based on the determination that an instruction to execute the camera function is given in step S401, the processes of steps S403 and S404 are executed, and image capturing by the standard rear camera is started. Alternatively, instead of the standard rear camera, the wide-angle rear camera may be caused to operate first. Yet alternatively, a camera unit and an image capturing mode selected in the previous use of the camera function may be stored, and the camera unit selected in the previous use of the camera function may be caused to operate in the image capturing mode selected in the previous use of the camera function.

After the system control unit 50 starts the execution of the camera function and displays the live view image and the display items, the system control unit 50 monitors an operation by the user on the operation unit 70 and executes a process in response to the operation by the user.

In step S405, the system control unit 50 determines whether to switch to the wide-angle camera 204 among the rear cameras (the wide-angle rear camera). If the system control unit 50 is to switch to the wide-angle rear camera 204, the processing proceeds to step S406. Then, the system control unit 50 executes the processes of steps S406 and S407, thereby switching from image capturing by the current camera to image capturing by the wide-angle rear camera 204. If the wide-angle icon 504-2 is touched, or if the image-taking angle of view is changed by a pinch-in operation or a pinch-out operation and reaches an angle of view corresponding to the wide-angle rear camera, the system control unit 50 determines that a switch to the wide-angle rear camera 204 is to be made.

In step S406, the system control unit 50 starts the camera unit (wide-angle rear camera) 204, which is the rear camera including the wide-angle lens 103*d*, and switches to image capturing by the wide-angle rear camera 204. Then, in step S407, the system control unit 50 displays a display screen for the wide-angle rear camera including a live view image captured by the wide-angle rear camera 204 and various display items on the display unit 28. The display of the screen for the wide-angle rear camera including the live view image captured by the wide-angle rear camera 204 continues until a switch is made to another camera.

After the processes of steps S406 and S407 are executed, the processing returns to step S405. In step S405, the system control unit 50 monitors an operation by the user on the operation unit 70 and executes a process corresponding to the operation by the user.

Figure 5B:
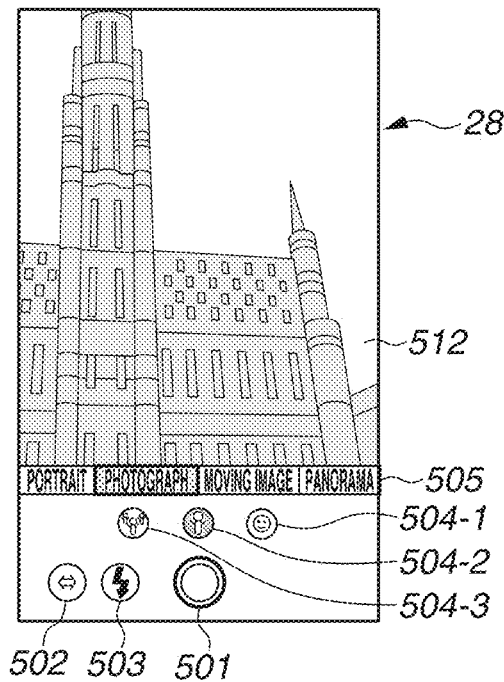
FIG. 5B is an example of display when the camera function of the smartphone 100 is executed.

FIG. 5B is an example of display of the display screen for the wide-angle rear camera that is displayed when the wide-angle camera 204 among the rear cameras (the wide-angle rear camera) is operating. In the example of display in FIG. 5B, display items such as the image capturing button 501, the rear camera/front camera switch button 502, the flash setting icon 503, the angle-of-view switch icons 504, and the image capturing mode settings 505 are displayed together with a live view image 512.

The live view image 512 is captured by the wide-angle rear camera 204. Also on this screen, the user can change the angle of view of the live view image by performing a pinch-in operation or a pinch-out operation on the live view image. The image capturing button 501, the rear camera/front camera switch button 502, the flash setting icon 503, the angle-of-view switch icons 504, and the image capturing mode settings 505 are the same display items as those in FIG. 5A and displayed at the same positions. In FIG. 5B, since the currently set image capturing mode is the photograph (still image) capturing mode, the photograph (still image) mode is displayed in a selected state. Moreover, since the wide-angle rear camera is operating, the wide-angle icon 504-2 is displayed in a selected state.

In step S408, the system control unit 50 determines whether to switch to the ultra wide-angle camera 205 among the rear cameras (the ultra wide-angle rear camera). If the system control unit 50 is to switch to the ultra wide-angle rear camera 205, the processing proceeds to step S409. Then, the system control unit 50 executes the processes of steps S409 and S410, thereby switching from image capturing by the current camera to image capturing by the ultra wide-angle rear camera 205. If the ultra wide-angle icon 504-3 is touched, or if the image-taking angle of view is changed by a pinch-in operation or a pinch-out operation and reaches an angle of view corresponding to the ultra wide-angle rear camera, the system control unit 50 determines that a switch to the ultra wide-angle rear camera 205 is to be made.

In step S409, the system control unit 50 starts the camera unit (ultra wide-angle rear camera) 205, which is the rear camera including the ultra wide-angle lens 103*e*, and switches to image capturing by the ultra wide-angle rear camera 205. Then, in step S410, the system control unit 50 displays a display screen for the ultra wide-angle rear camera including a live view image captured by the ultra wide-angle rear camera 205 and various display items on the display unit 28. The display of the screen for the ultra wide-angle rear camera including the live view image captured by the ultra wide-angle rear camera 205 continues until a switch is made to another camera.

After the processes of steps S409 and S410 are executed, the processing returns to step S405. In step S405, the system control unit 50 monitors an operation by the user on the operation unit 70 and executes a process corresponding to the operation by the user.

Figure 5C:
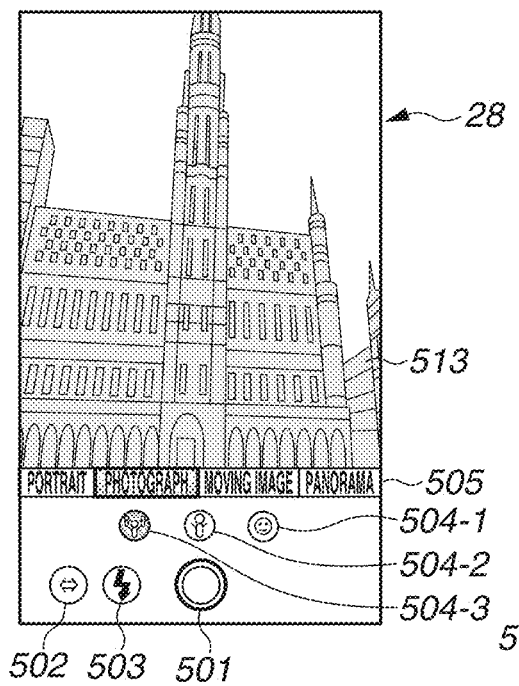
FIG. 5C is an example of display when the camera function of the smartphone 100 is executed.

FIG. 5C is an example of display of the display screen for the ultra wide-angle rear camera that is displayed when the ultra wide-angle camera 205 among the rear cameras (the ultra wide-angle rear camera) is operating. In the example of display in FIG. 5C, display items such as the image capturing button 501, the rear camera/front camera switch button 502, the flash setting icon 503, the angle-of-view switch icons 504, and the image capturing mode settings 505 are displayed together with a live view image 513.

The live view image 513 is captured by the ultra wide-angle rear camera 205. Also on this screen, the user can change the angle of view of the live view image by performing a pinch-in operation or a pinch-out operation on the live view image. The image capturing button 501, the rear camera/front camera switch button 502, the flash setting icon 503, the angle-of-view switch icons 504, and the image capturing mode settings 505 are the same display items as those in FIGS. 5A and 5B and displayed at the same positions. In FIG. 5C, since the currently set image capturing mode is the photograph (still image) capturing mode, the photograph (still image) mode is displayed in a selected state. Moreover, since the ultra wide-angle rear camera is operating, the ultra wide-angle icon 504-3 is displayed in a selected state.

In step S411, the system control unit 50 determines whether to switch to the standard camera 203 among the rear cameras (the standard rear camera). If the system control unit 50 is to switch to the standard rear camera 203, the processing proceeds to step S403. Then, the system control unit 50 executes the processes of steps S403 and S404, thereby switching from image capturing by the current camera to image capturing by the standard rear camera 203. If the standard icon 504-1 is touched, or if the image-taking angle of view is changed by a pinch-in operation or a pinch-out operation and reaches an angle of view corresponding to the standard rear camera, the system control unit 50 determines that a switch to the standard rear camera 203 is to be made.

After the processes of steps S403 and S404 are executed, the processing returns to step S405. In step S405, the system control unit 50 monitors an operation by the user on the operation unit 70 and executes a process corresponding to the operation by the user.

In step S412, the system control unit 50 determines whether an instruction to switch the image capturing mode is given by the user operating (touching) any of the display icons of the image capturing mode settings 505. If an instruction to switch the image capturing mode is given, the processing proceeds to step S413. If an instruction is other than the instruction to switch the image capturing mode, the processing proceeds to step S419.

In step S413, the system control unit 50 executes a process for changing the image capturing mode. The system control unit 50 changes image processing according to the image capturing mode. Next, in step S414, the system control unit 50 determines whether the image capturing mode is changed to a moving image mode. If the image capturing mode is changed to the moving image mode, the processing proceeds to step S418. If the image capturing mode is not changed to the moving image mode, the processing proceeds to step S415.

In step S418, the system control unit 50 performs control to display a magnification change bar on the display unit 28.

Figure 5D:
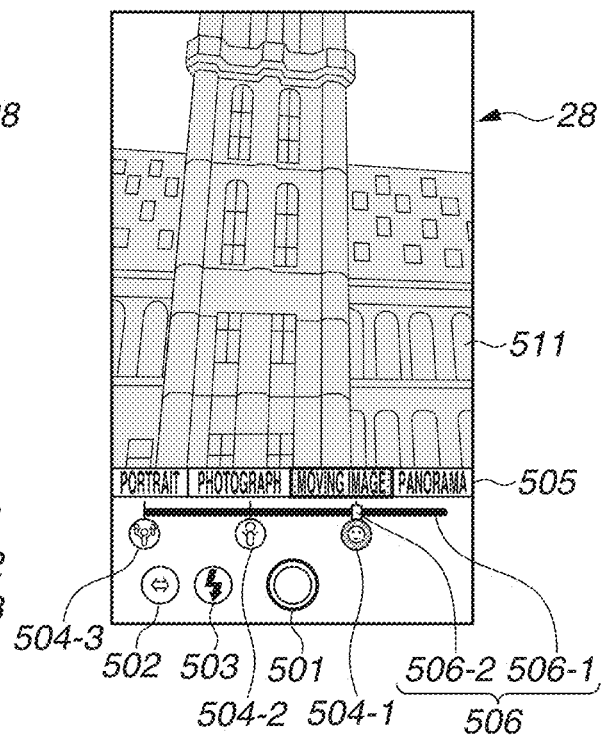
FIG. 5D is an example of display when the camera function of the smartphone 100 is executed.

With reference to FIG. 5D, the magnification change bar is described. FIG. 5D is an example of display of a display screen for the standard rear camera in the case of the moving image mode. Portions designated by the same signs as those in FIG. 5A are the same as those in FIG. 5A, and therefore are not described. In the moving image mode for capturing (recording) a moving image, a magnification change bar 506 is displayed. The magnification change bar 506 includes a magnification bar 506-1 and a slider 506-2. The magnification bar 506-1 corresponds to angles of view (the magnifications) that can be captured by the rear cameras (the standard rear camera, the wide-angle rear camera, and the ultra wide-angle rear camera). The user can change the zoom magnification (change the angle of view) of the live view image by moving the slider 506-2 by a touch operation. As illustrated in FIG. 5D, the standard icon 504-1, the wide-angle icon 504-2, and the ultra wide-angle icon 504-3 for switching between the angles of view may be displayed at positions of the corresponding magnifications on the magnification bar 506-1. Such display enables the user to easily grasp the correspondence relationships between the magnifications (the angles of view) and the cameras (the standard rear camera, the wide-angle rear camera, and the ultra wide-angle rear camera). If the image capturing mode is switched to the moving image mode not on the display screen for the standard rear camera but on the display screens for the wide-angle rear camera or the ultra wide-angle rear camera, the magnification change bar 506 is also displayed as illustrated in FIG. 5D. In the capturing of a moving image, if the magnification (the angle of view) is abruptly changed particularly during image capturing (recording), a resulting video is difficult to view. Thus, it is necessary to smoothly change the magnification (the angle of view). While it is possible to smoothly change the magnification (the angle of view) by the user performing a pinch-in or pinch-out operation on the live view image, a hand performing the operation hides the live view image, it is difficult to adjust the magnification (the angle of view) while checking the live view image. Thus, in the present exemplary embodiment, if the image capturing mode is changed to the moving image mode, the magnification change bar is displayed at a position where the live view image is not displayed, whereby it is possible to change the magnification while checking the live view image even during moving image capturing. In the case where the magnification change bar is to be displayed at a position overlapping the live view image, the magnification change bar may be displayed in an area of an edge portion of the live view image. If the magnification change bar is displayed in the area of the edge portion of the live view image, it is possible to perform the magnification change operation while checking the live view image. If the magnification change bar is displayed, the processing returns to step S405. In step S405, the system control unit 50 monitors an operation by the user on the operation unit 70 and executes a process in response to the operation by the user. In the present exemplary embodiment, when the image capturing mode is switched to the moving image mode, the magnification change bar is displayed. Alternatively, instead of displaying the magnification change bar when the image capturing mode is switched to the moving image mode, the magnification change bar may be displayed at the start of moving image capturing (the start of moving image recording). Then, the magnification change bar may be hidden at the end of the moving image capturing (the end of the moving image recording), so that the magnification change bar may be displayed during the moving image recording.

If it is determined in step S414 that the image capturing mode is switched to an image capturing mode other than the moving image mode, then in step S415, the system control unit 50 hides the magnification change bar 506 and changes the display back to the display as illustrated in FIG. 5A, 5B, or 5C. In a case where the magnification change bar 506 is not displayed before the image capturing mode is changed, no process is performed in step S415. Next, in step S416, the system control unit 50 acquires information regarding a lens (a camera unit) that can be used in the image capturing mode after the change, i.e., the currently selected image capturing mode. Then, in step S417, if the lens (the camera unit) that can be used acquired in step S416 does not include the lens (the camera unit) that is currently used, the system control unit 50 determines that it is necessary to switch to the standard lens 103*c* (the standard rear camera 203). In the present exemplary embodiment, in the photograph (still image) mode and the moving image mode, image capturing can be performed using any of the standard, wide-angle, and ultra wide-angle lenses (camera units). However, a panorama can be captured only by the standard lens (the standard camera), and a portrait can be captured only at the angle of view that can be captured by the standard lens (the standard camera). Thus, if the image capturing mode is switched to the portrait image capturing mode or the panoramic image capturing mode, the system control unit 50 determines that it is necessary to switch to the standard camera. Then, the processing proceeds to step S403 so that the system control unit 50 switches to the operation of the standard rear camera. Then, the system control unit 50 switches to image capturing by the standard rear camera 203. If it is not necessary to switch to the standard camera, the system control unit 50 continues image capturing by the current camera unit, and the processing returns to step S405. In step S405, the system control unit 50 monitors an operation by the user on the operation unit 70 and executes a process in response to the operation by the user.

In the present exemplary embodiment, in the portrait image capturing mode, image capturing is performed by both the standard rear camera 203 and the wide-angle rear camera 204, and images captured by the two cameras are combined together to generate a combined image in which the background is blurred and an object is in focus. Thus, actually, not only the standard rear camera 203 but also the wide-angle rear camera starts. Image capturing, however, can be performed only at the angle of view that can be captured by the standard rear camera. Thus, the standard icon is displayed in a selected state as in the display screen for the standard rear camera. Also in the panoramic image capturing mode, image capturing cannot be performed by a camera other than the standard camera including the standard lens. Thus, in the portrait image capturing mode and the panoramic image capturing mode, the wide-angle icon 504-2 and the ultra wide-angle icon 504-3 may be hidden or grayed out.

In step S419, the system control unit 50 determines whether an instruction to record an image is input by the user operating the image capturing button 501. If an instruction to record an image is input, the processing proceeds to step S420. If an instruction is other than the instruction to record an image, the processing proceeds to step S421. In step S420, the system control unit 50 executes a recording process of an image. In the recording process, the system control unit 50 records an image captured and acquired by the camera unit that is currently operating and capturing the live view image. In the photograph mode, the system control unit 50 performs control to capture a still image in response to an operation on the image capturing button 501 and record the still image in the recording medium 200. In the moving image mode, the system control unit 50 performs control to record, in the recording medium 200, a moving image captured from when the image capturing button 501 is touched to when the image capturing button 501 is touched again. As described above, the system control unit 50 executes a recording process according to the image capturing mode. In the recording process, the system control unit 50 performs control to record the image at the angle of view of the live view image currently displayed on the display unit 28. When the recording process is completed, the processing returns to step S405. In step S405, the system control unit 50 monitors an operation by the user on the operation unit 70 and executes a process in response to the operation of the user.

In step S421, the system control unit 50 determines whether an instruction to switch to the front cameras is input by the user performing a touch operation on the rear camera/front camera switch button 502 during image capturing by the rear cameras. If an instruction to switch to the front cameras is input, the processing proceeds to step S423. If an instruction is other than the instruction to switch to the front cameras, the processing proceeds to step S422.

In step S422, the system control unit 50 determines whether an operation to end the camera function is performed on the operation unit 70. If an operation for an instruction to end the camera function is performed, the system control unit 50 ends the camera function, and the processing of the flowchart ends. If an operation is performed for an instruction other than the instruction to end the camera function, the processing returns to step S405. In step S405, the system control unit 50 monitors an operation by the user on the operation unit 70 and executes a process in response to the operation by the user.

The processes of steps S403 to S422 are a processing flow when an image is captured by a rear camera placed on the first surface (any of the standard rear camera 203, the wide-angle rear camera 204, and the ultra wide-angle rear camera 205). Meanwhile, the processes of steps S425 to S440 to be described below are a processing flow when an image is captured by a front camera placed on the second surface (either of the standard front camera 201 and the wide-angle front camera 202). The processes of step S423, S424, S442, and S443 are processing for determining which angle of view a camera to be started corresponds to when image capturing by the rear cameras and image capturing by the front cameras are switched.

If an instruction to switch from the rear cameras to the front cameras is given in step S421, first, in step S423, the system control unit 50 acquires information regarding the rear camera that is currently operating. Specifically, the system control unit 50 acquires information regarding which of the camera units 203 to 205 among the rear cameras has performed image capturing. Next, in step S424, based on the information acquired in step S423 regarding the rear camera that is operating and information regarding the correspondence relationships between the rear cameras and the front cameras stored in the non-volatile memory 56, the system control unit 50 determines which of the standard front camera and the wide-angle front camera is to be started.

FIG. 6 is a diagram illustrating the correspondence relationships between the rear cameras and the front cameras according to the present exemplary embodiment. Based on information regarding the correspondence relationships, if an instruction to switch to the front cameras is given while the standard rear camera 203 is operating, the system control unit 50 determines that the standard front camera 201 is to be started. If an instruction to switch to the front cameras is given while the wide-angle rear camera 204 is operating, the system control unit 50 determines that the system control unit 50 is to switch to the wide-angle front camera 202 and also start the wide-angle front camera 202 by performing an electronic zoom process to obtain a particular magnification and making the imaging angle of view smaller than the angle of view that can be captured by the wide-angle front camera 202. If an instruction to switch to the front cameras is given while the ultra wide-angle rear camera 205 is operating, the system control unit 50 determines that the wide-angle front camera 202 is to be started.

As described above, in the smartphone according to the present exemplary embodiment, if an instruction to switch from the rear cameras to the front cameras is given, then depending on the angle of view of a rear camera (a rear camera unit or lens that has been used), the smartphone switches to the front cameras, and then automatically selects either the camera unit 201 including the standard lens 103*a* or the camera unit including the wide-angle lens 103*b* to operate, and switches to the camera unit.

For example, in a case where the user adjusts the angle of view of a rear camera to include the background, and then switches to the front cameras because the user wants to capture an image including the user him- or herself, it is desirable to start a front camera at an angle of view as close to that of the rear camera as possible. If a front camera having an angle of view set as an initial setting is started regardless of the angle of view of the rear camera, the user needs to give an instruction to switch to the front cameras and then further perform an operation for switching between the standard camera and the wide-angle camera of the front cameras, which is troublesome. Accordingly, in the present exemplary embodiment, the angles of view of the rear cameras (the standard camera including the standard lens, the wide-angle camera including the wide-angle lens, and the ultra wide-angle camera including the ultra wide-angle lens) are associated with the front camera to be started (the standard camera including the standard lens or the wide-angle camera including the wide-angle lens) when a switch is made to the front cameras. Thus, it is possible to reduce the trouble of user operations such as switching between the camera units of the front cameras and adjusting the angle of view after a switch is made to the front cameras.

If it is determined in step S424 that the standard front camera is to be started, then in step S425, the system control unit 50 starts the camera unit (standard front camera) 201 including the standard lens 103*a* and switches to image capturing by the standard front camera. Then, in step S426, the system control unit 50 displays a display screen for the standard front camera including a live view image captured by the standard front camera 201 and various display items on the display unit 28. The display of the screen for the standard front camera including the live view image captured by the standard front camera 201 continues until a switch is made to another camera. After the processes of steps S425 and S426 are executed and a switch is made to image capturing by the standard front camera, the processing proceeds to step S429. In step S429, the system control unit 50 monitors an operation by the user on the operation unit 70 and executes a process in response to the operation by the user.

Figure 5E:
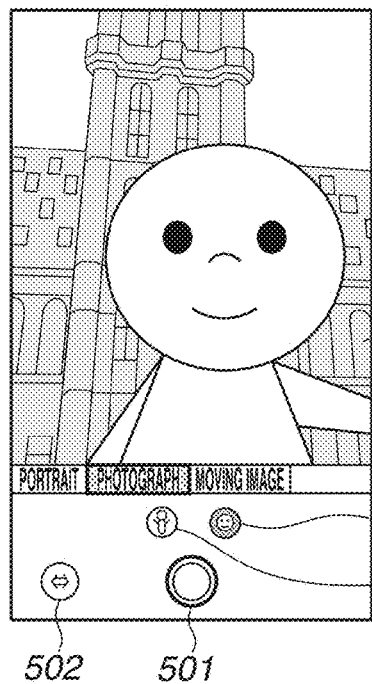
FIG. 5E is an example of display when the camera function of the smartphone 100 is executed.

FIG. 5E is an example of display of the display screen for the standard front camera that is displayed when image capturing is performed by the standard camera 201 of the front cameras (the standard front camera). In the example of display in FIG. 5E, display items such as the image capturing button 501, the rear camera/front camera switch button 502, the angle-of-view switch icons 504, and the image capturing mode settings 505 are displayed together with a live view image 514.

The live view image 514 is captured and obtained by the standard front camera 201. Also on this screen, the user can change the angle of view of the live view image by performing a pinch-in operation or a pinch-out operation on the live view image. The image capturing button 501, the rear camera/front camera switch button 502, the angle-of-view switch icons 504, and the image capturing mode settings 505 are the same display items as those in FIG. 5A. In FIG. 5E, since the currently set image capturing mode is the photograph (still image) capturing mode, the photograph (still image) mode is displayed in a selected state. Moreover, since the standard front camera is operating, the standard icon 504-1 is displayed in a selected state. In the present exemplary embodiment, two front cameras, namely the standard front camera and the wide-angle front camera, are provided, and therefore, among the angle-of-view switch icons 504, the standard icon 504-1 and the wide-angle icon 504-2 are displayed, and the ultra wide-angle icon 504-3 is not displayed. In the present exemplary embodiment, the front cameras cannot perform panoramic image capturing, and therefore, in the image capturing mode settings 505, the panorama is not displayed, and the photograph (still image), the moving image, and the portrait are displayed. The image capturing mode can be changed to these image capturing modes. The front cameras cannot perform flash image capturing, and therefore, the flash setting icon 503 is not displayed.

If it is determined in step S424 that not the standard front camera but the wide-angle front camera is to be started, then in step S427, the system control unit 50 starts the camera unit (wide-angle front camera) 202 including the wide-angle lens 103*b* and switches to image capturing by the wide-angle front camera. Then, in step S428, the system control unit 50 displays a display screen for the wide-angle front camera including a live view image captured by the wide-angle front camera 202 and various display items on the display unit 28. The display of the screen for the wide-angle front camera including the live view image captured by the wide-angle front camera 202 continues until a switch is made to another camera. If it is determined in step S424 that the wide-angle front camera is to be started and an electronic zoom process is to be performed, the system control unit 50 performs control to start the wide-angle front camera 202 and switch to image capturing by the wide-angle front camera. Then, the system control unit 50 also performs control to perform the electronic zoom process, make the image-taking angle of view smaller than the angle of view that can be captured by the wide-angle front camera 202, acquire an image, and display a live view image.

After the processes of steps S427 and S428 are executed, and a switch is made to image capturing by the wide-angle front camera, the processing proceeds to step S429. In step S429, the system control unit 50 monitors an operation by the user on the operation unit 70 and executes a process in response to the operation by the user.

Figure 5F:
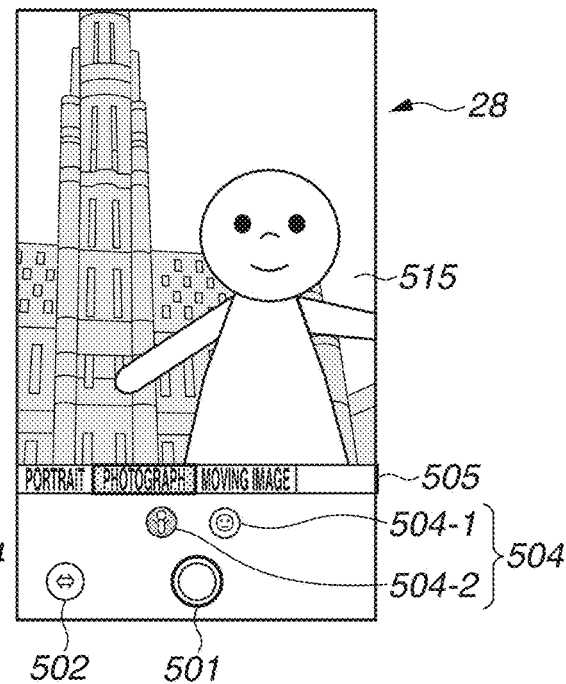
FIG. 5F is an example of display when the camera function of the smartphone 100 is executed.

FIG. 5F is an example of display of the display screen for the wide-angle front camera that is displayed when image capturing is performed by the wide-angle camera 202 of the front cameras (the wide-angle front camera). In the example of display in FIG. 5F, display items such as the image capturing button 501, the rear camera/front camera switch button 502, the angle-of-view switch icons 504, and the image capturing mode settings 505 are displayed together with a live view image 515.

The live view image 515 is captured and obtained by the wide-angle front camera 202. Also on this screen, the user can change the angle of view of the live view image by performing a pinch-in operation or a pinch-out operation on the live view image. The image capturing button 501, the rear camera/front camera switch button 502, the angle-of-view switch icons 504, and the image capturing mode settings 505 are the same display items as those in FIG. 5E and displayed at the same positions. In FIG. 5F, since the currently set image capturing mode is the photograph (still image) capturing mode, the photograph (still image) mode is displayed in a selected state. Moreover, since the wide-angle front camera is operating, the wide-angle icon 504-2 is displayed in a selected state.

In step S429, the system control unit 50 determines whether to switch to the standard camera 201 of the front cameras (the standard front camera). If the standard icon 504-1 is touched, or if the image-taking angle of view is changed by a pinch-in operation or a pinch-out operation and reaches an angle of view corresponding to the standard front camera, the system control unit 50 determines that a switch to the standard front camera 201 is to be made. If the system control unit 50 is to switch to the standard front camera 201, the processing proceeds to step S425. Then, the system control unit 50 executes the processes of steps S425 and S426, thereby switching from image capturing by the current camera (the wide-angle front camera) to image capturing by the standard front camera 201. If the system control unit 50 is not to switch to the standard front camera, the processing proceeds to a next determination (step S430).

In step S430, the system control unit 50 determines whether to switch to the wide-angle camera 202 of the front cameras (the wide-angle front camera). If the wide-angle icon 504-2 is touched, or if the image-taking angle of view is changed by a pinch-in operation or a pinch-out operation and reaches an angle of view corresponding to the wide-angle front camera, the system control unit 50 determines that a switch to the wide-angle front camera 202 is to be made. If the system control unit 50 is to switch to the wide-angle front camera 202, the processing proceeds to step S427. Then, the system control unit 50 executes the processes of steps S427 and S428, thereby switching from image capturing by the current camera (the standard front camera) to image capturing by the wide-angle front camera 202. If the system control unit 50 is not to switch to the wide-angle front camera, the processing proceeds to a next determination (step S431).

In step S431, the system control unit 50 determines whether an instruction to switch the image capturing mode is given by the user operating (touching) any of the display icons of the image capturing mode settings 505. If an instruction to switch the image capturing mode is given, the processing proceeds to step S432. If an instruction to switch the image capturing mode is not given, the processing proceeds to a next determination in step S438.

In step S432, the system control unit 50 executes a process for changing the image capturing mode. The system control unit 50 changes image processing according to the image capturing mode. Next, in step S433, the system control unit 50 determines whether the image capturing mode is changed to the moving image mode. If the image capturing mode is changed to the moving image mode, the processing proceeds to step S437. If the image capturing mode is not changed to the moving image mode, the processing proceeds to step S434.

Figure 5G:
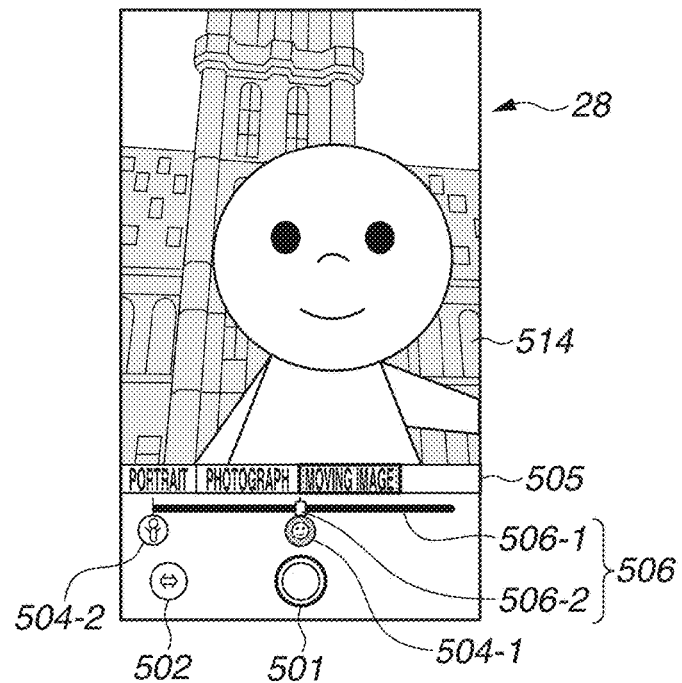
FIG. 5G is an example of display when the camera function of the smartphone 100 is executed.

If the image capturing mode is changed to the moving image mode, then in step S437, the system control unit 50 performs control to display the magnification change bar 506 on the display unit 28 as illustrated in FIG. 5G. The magnification change bar 506 is similar to that displayed when the image capturing mode transitions to the moving image mode in image capturing by the rear cameras. The magnification bar 506-1, however, corresponds to angles of view (the magnifications) that can be captured by the front cameras (the standard front camera and the wide-angle front camera). The user can change the zoom (change the angle of view) of the live view image by moving the slider 506-2 by a touch operation. As illustrated in FIG. 5G, the standard icon 504-1 and the wide-angle icon 504-2 for switching between the angles of view are displayed at the positions of the corresponding magnifications on the magnification bar 506-1. As described above, also in image capturing by the front cameras, if the image capturing mode is changed to the moving image mode for capturing (recording) a moving image, the magnification change bar is displayed so that it is possible to change the angle of view while checking the live view image during moving image capturing (moving image recording).

If the image capturing mode is switched to the moving image mode, then in step S437, the system control unit displays the magnification change bar 506, and the processing proceeds to step S427. Then, the system control unit performs the processes of steps S427 and S428, thereby switching to image capturing by the wide-angle front camera 202. If the image capturing by the wide-angle front camera is already performed, the processing may proceed to step S429 and skip the processes of steps S427 and S428. As described above, in the present exemplary embodiment, in response to a switch from another image capturing mode to the moving image mode, the front cameras switch to the moving image mode and also switch to image capturing by the wide-angle front camera. In a case where a still image is captured by the front cameras, the user often captures him- or herself with the user's face in close-up. However, in a case where a moving image is captured by the front cameras, the user often captures an image that includes a plurality of people including the user, an image that includes the entire body of the user, or an image of him- or herself and the background. In such a case, it is desirable to perform image capturing by the wide-angle front camera. Thus, in the present exemplary embodiment, when image capturing by the front cameras is performed, in response to a switch to the moving image mode, the front cameras switch to image capturing by the wide-angle front camera 202, thereby saving the user the trouble of an operation for changing to the wide-angle camera. When image capturing is performed by the rear cameras, as described above, even if the image capturing mode is switched to the moving image mode, the rear cameras do not automatically switch to the wide-angle camera or the ultra wide-angle camera, and image capturing by a camera unit that has been used before the switch to the moving image mode continues.

If it is determined in step S433 that the image capturing mode is switched to an image capturing mode other than the moving image mode, then in step S434, the system control unit 50 hides the magnification change bar 506. If the magnification change bar 506 is not displayed before a change of the image capturing mode, the process of step S434 may be skipped. Next, in step S435, the system control unit 50 acquires information regarding a lens (a camera unit) that can be used in the image capturing mode after the change, i.e., the currently selected image capturing mode. Then, in step S436, if the lens (the camera unit) that can be used acquired in step S435 does not include the lens (the camera unit) that is currently used, the system control unit 50 determines that it is necessary to switch to the standard lens 103a (the standard front camera 201). In the present exemplary embodiment, in the photograph (still image) mode and the moving image mode, image capturing can be performed using either of the standard and wide-angle lenses (camera units). However, a portrait can be captured only at the angle of view that can be captured by the standard lens (the standard camera). Thus, if the image capturing mode is switched to the portrait, the system control unit 50 determines that it is necessary to switch to the standard camera. Then, the processing proceeds to step S425 so that the system control unit 50 switches to the operation by the standard front camera. Then, in step S425, the system control unit 50 switches to image capturing by the standard front camera 201. If it is not necessary to switch to the standard camera, the system control unit 50 continues image capturing by the current camera unit, and the processing returns to step S429. In step S429, the system control unit 50 monitors an operation of by user on the operation unit 70 and executes a process in response to the operation by the user.

In the portrait image capturing mode by the front cameras, similarly to that by the rear cameras, image capturing is performed by both the standard front camera 201 and the wide-angle front camera 202, and images captured by the two cameras are combined together to generate a combined image in which the background is blurred and an object is in focus.

In step S438, the system control unit 50 determines whether an instruction to record an image is input by the user operating the image capturing button 501. If an instruction to record an image is input, the processing proceeds to step S439. If an instruction is other than the instruction to record an image, the processing proceeds to step S440. In step S439, the system control unit 50 executes a recording process of an image. In the recording process, the system control unit 50 records an image captured and acquired by the camera unit that is currently operating and capturing the live view image. In the photograph mode, the system control unit 50 performs control to capture a still image in response to an operation on the image capturing button 501 and record the still image in the recording medium 200. In the moving image mode, the system control unit 50 performs control to record, in the recording medium 200, a moving image captured from when the image capturing button 501 is touched to when the image capturing button 501 is touched again. As described above, the system control unit 50 executes a recording process according to the image capturing mode. In the recording process, the system control unit 50 performs control to record the image at the angle of view of the live view image currently displayed on the display unit 28. When the recording process is completed, the processing returns to step S429. In step S429, the system control unit 50 monitors an operation by the user on the operation unit 70 and executes a process in response to the operation of the user.

In step S440, the system control unit 50 determines whether an instruction to switch to the rear cameras is input by the user performing a touch operation on the rear camera/front camera switch button 502 during image capturing by the front cameras. If an instruction to switch to the rear cameras is input, the processing proceeds to step S442. If an instruction is other than the instruction to switch to the rear cameras, the processing proceeds to step S441.

If it is determined in step S440 that the instruction to switch to the rear cameras is input, then in step S442, the system control unit 50 acquires information regarding the front camera that is currently operating. Specifically, the system control unit 50 acquires information regarding which of the camera units 201 and 202 of the front cameras has performed image capturing. Next, in step S443, based on the information acquired in step S442 regarding the front camera that is operating and the information regarding the correspondence relationships between the rear cameras and the front cameras stored in the non-volatile memory 56 (FIG. 6), the system control unit 50 determines which of the standard rear camera, the wide-angle rear camera, and the ultra wide-angle rear camera is to be started. If the instruction to switch to the rear cameras is given during image capturing by the standard front camera 201, the system control unit 50 determines that the standard rear camera 203 is to be started. Then, the processing proceeds to step S403. In step S403, the system control unit 50 switches to image capturing by the standard rear camera. If it is during image capturing by the wide-angle front camera 202, depending on the angle of view that is being captured by the wide-angle front camera, the system control unit 50 switches the determination thereof between starting the wide-angle rear camera 204 and starting the ultra wide-angle rear camera 205. In the present exemplary embodiment, as illustrated in FIG. 6, if image capturing by the wide-angle front camera is being performed without an electronic zoom process, the system control unit 50 determines that a switch to the ultra wide-angle rear camera is to be made. Then, the processing proceeds to step S406. In step S406, the system control unit 50 switches to image capturing by the ultra wide-angle rear camera. If image capturing by the wide-angle front camera is being performed with the electronic zoom process, the system control unit 50 determines that a switch to the wide-angle rear camera is to be made. Then, the processing proceeds to step S409. In step S409, the system control unit 50 switches to image capturing by the wide-angle rear camera.

As described above, in the smartphone according to the present exemplary embodiment, if an instruction to switch from the front cameras to the rear cameras is given, then depending on the angle of view of a front camera (a front camera unit or lens that has been used), the smartphone switches to the rear cameras, and then automatically selects a camera unit to operate from among the standard rear camera 203 including the standard lens 103c, the wide-angle camera 204 including the wide-angle lens 103d, and the ultra wide-angle camera 205 including the ultra wide-angle lens 103e and switches to the camera unit.

In step S441, the system control unit 50 determines whether an operation to end the camera function is performed on the operation unit 70. If an operation for an instruction to end the camera function is performed, the system control unit 50 ends the camera function, and the processing of the flowchart ends. If an operation is performed for an instruction other than the instruction to end the camera function, the processing returns to step S429. In step S429, the system control unit 50 monitors an operation by the user on the operation unit 70 and executes a process in response to the operation by the user.

In the smartphone 100 according to the present exemplary embodiment, when the camera function is executed, the above processing is executed.

In the above exemplary embodiment, when a switch is made from image capturing by the rear cameras to image capturing by the front cameras, then depending on a camera unit or lens that has been used in the image capturing by the rear cameras, the smartphone 100 switches a camera unit or lens to be used in the image capturing by the front cameras. When a switch is made from image capturing by the front cameras to image capturing by the rear cameras, then depending on a camera unit or lens that has been used in the image capturing by the front cameras, the smartphone 100 switches a camera unit or lens to be used in the image capturing by the rear cameras. However, when the switch is made from image capturing by the front cameras to image capturing by the rear cameras, then depending on a camera unit or lens that has been used in the image capturing by the front cameras, the smartphone 100 may not switch to a camera unit or lens to be used in the image capturing by the rear cameras, and may switch to a particular camera unit. Cases where the switch is made from the rear cameras to the front cameras include a case where, after the angle of view is adjusted using the rear cameras so that the background is included, the user switches to the front cameras and captures an image so that the user him- or herself is in the image. In such a case, it is desirable that a switch is made to a camera having a close angle of view. It is, however, not assumed that, after the angle of view is adjusted using the front cameras so that the background is included, the user switches to the rear cameras and captures an image. Thus, in a case where a switch is made from the front cameras to the rear cameras, the smartphone 100 may switch to a particular camera unit (e.g., a camera unit set to be initially started) without switching to a camera having a close angle of view. Although a camera unit set to be initially started among the rear cameras is the standard rear camera 203 in the present exemplary embodiment, the camera unit set to be initially started among the rear cameras may be the wide-angle rear camera 204, which has a medium-size angle of view among the three rear cameras.

When a switch is made between the rear cameras and the front cameras, and if a particular image capturing setting is made, the smartphone 100 may switch to image capturing by a particular camera regardless of the correspondence relationships between the rear cameras and the front cameras. Depending on an image stabilization setting or a recording resolution, a camera that can be used may be limited. In such a case, the smartphone 100 may switch to the camera that can be used regardless of the correspondence relationships between the rear cameras and the front cameras. For example, when the image stabilization setting is on, or when the recording resolution has the maximum size, the camera that can be used is limited to the standard camera. When such an image capturing setting is made and a switch is made between the rear cameras and the front cameras, even if the wide-angle camera is the associated camera in the correspondence relationships between the rear cameras and the front cameras, the smartphone 100 may switch to image capturing by the standard camera. When another particular image capturing setting is made, even if the standard camera is the associated camera, the smartphone 100 may switch to image capturing by the wide-angle camera.

In a case where a switch is made between the standard, wide-angle, and ultra wide-angle cameras or between the angles of view in response to an operation by the user when image capturing by the rear cameras is performed, and when a switch is made from the rear cameras to the front cameras, a front camera to be started may be switched based on the correspondence relationships between the rear cameras and the front cameras. In a case where a switch is not made between the standard, wide-angle, and ultra wide-angle cameras or between the angles of view when image capturing by the rear cameras is performed, a switch may be made to a particular front camera (e.g., the standard front camera) without using the correspondence relationships between the rear cameras and the front cameras. The same applies to a switch from the front cameras to the rear cameras.

In the above exemplary embodiment, the rear cameras include three camera units, and the front cameras include two camera units. However, the numbers of camera units are not limited to these numbers. Four camera units may be included in the rear cameras, or three camera units may be included in the front cameras. In the above exemplary embodiment, the rear cameras include the standard rear camera including the standard lens, the wide-angle rear camera including the wide-angle lens, and the ultra wide-angle rear camera including the ultra wide-angle lens. Alternatively, the rear cameras may include a combination of lenses and cameras having other angles of view, such as a telephoto rear camera including a telephoto lens, the standard rear camera, and the wide-angle rear camera. The correspondence relationships between the rear cameras and the front cameras when a switch is made between the rear cameras and the front cameras are set depending on the configurations of the rear cameras and the front cameras. For example, in a case where three rear cameras that are the wide-angle rear camera, the standard rear camera, and the telephoto rear camera, and two front cameras that are the wide-angle front camera and the standard front camera are included, and the correspondence relationships are set so that if a switch is made to the front cameras during image capturing by the wide-angle rear camera, the switch is made to the wide-angle front camera, and if a switch is made to the front cameras during image capturing by the standard rear camera or image capturing by the telephoto rear camera, the switch is made to the standard front camera. The correspondence relationships may be set depending on the angles of view of the rear cameras (lenses) and the angles of view of the front cameras (lenses).

Alternatively, a configuration may be employed in which a plurality of rear cameras is not provided, and a single rear camera is provided and capable of performing optical zoom. For example, in the case of a smartphone including a single rear camera capable of performing optical zoom and two front cameras that are the wide-angle front camera and the standard front camera, and when image capturing is performed by the rear camera performing optical zoom to the telephoto side, then according to an instruction to switch to the front cameras, a switch may be made to image capturing by the standard front camera. When optical zoom is performed to the wide-angle side, then according to an instruction to switch to the front cameras, a switch may be made to image capturing by the wide-angle front camera. As described above, when a switch is made from the rear camera to the front cameras, then depending on the zoom magnification in optical zoom, i.e., the image-taking angle of view changed by the optical zoom, the smartphone may automatically change to which of the front cameras having a plurality of different angles of view the switch is to be made. Not only are the front cameras switched depending on optical zoom, but also an electronic zoom process may be performed on an image captured by a front camera so that the angle of view of the image is the angle of view at which image capturing has been performed by the rear camera.

In the above exemplary embodiment, in a case where an instruction to switch from the rear cameras to the front cameras is given, a front camera (a standard or wide-angle front camera) corresponding to a rear camera (a standard, wide-angle, or ultra wide-angle rear camera) that has been used or the angle of view at which image capturing has been performed by the rear camera is operated. However, when the moving image mode is set and a switch is made from the rear cameras to the front cameras, the switch may be made to image capturing by the wide-angle front camera regardless of a rear camera that has been used or the angle of view at which image capturing has been performed by the rear camera. As described above, this is because when a moving image is captured by the front cameras, many users do not capture images of only their faces, but capture a plurality of people or capture images including not only their faces but also their bodies.

The various types of control performed by the system control unit 50 in the description may be performed by a single piece of hardware, or the processing may be shared by a plurality of pieces of hardware, thereby controlling the entire apparatus. The control to be executed by the system control unit 50 may be executed by another block of the smartphone 100.

While the present invention has been described in detail based on its suitable exemplary embodiments, the present invention is not limited to these specific exemplary embodiments. The present invention also includes various forms without departing from the spirit and scope of the invention. Further, each of the above exemplary embodiments merely illustrate one exemplary embodiment of the present invention, and the exemplary embodiments can also be appropriately combined together.

Other Exemplary Embodiments

The present invention can also be realized by performing the following process, i.e., the process of supplying software (a program) for achieving the functions of the above exemplary embodiments to a system or an apparatus via a network or various storage media, and of causing a computer (or a central processing unit (CPU) or a microprocessor unit (MPU)) of the system or the apparatus to read and execute a program code. In this case, the program and a storage medium that stores the program constitute the present invention.

The present invention is not limited to the above embodiments and various changes and modifications can be made within the spirit and scope of the present invention. Therefore, to apprise the public of the scope of the present invention, the following claims are made.

According to the present invention, in response to a switch between image capturing modes or a switch from image capturing by a first image capturing unit to image capturing by a second image capturing unit, it is possible to switch to image capturing at an appropriate angle of view.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic device including a first surface and a second surface, the electronic device comprising:
   a first image capturing unit configured to capture an image using a lens placed on the first surface;
   a second image capturing unit configured to capture an image using a lens placed on the second surface, the second image capturing unit being configured to switch to first image capturing using a first lens and second image capturing using a second lens having a wider angle of view than an angle of view of the first lens; and
   a control unit configured to perform control to, during the image capturing by the second image capturing unit, in response to a user operation for changing from a still image capturing mode to a moving image capturing mode, switch to the moving image capturing mode and also switch from the first image capturing using the first lens to the second image capturing using the second lens.

2. The electronic device according to claim 1, wherein, in a case where the user operation for changing from the still image capturing mode to the moving image capturing mode is received during the first image capturing by the second image capturing unit, the control unit performs control to switch from the first image capturing to the second image capturing, and in a case where the user operation for changing from the still image capturing mode to the moving image capturing mode is received during the second image capturing by the second image capturing unit, the control unit performs control to continue the second image capturing.

3. The electronic device according to claim 1,
wherein the first image capturing unit performs third image capturing and fourth image capturing at a wider angle of view than an angle of view of the third image capturing, and
wherein, in a case where the user operation for changing from the still image capturing mode to the moving image capturing mode is received during the third image capturing by the first image capturing unit, the control unit performs control not to switch from the third image capturing to the fourth image capturing.

4. The electronic device according to claim 1, further comprising:
a display unit configured to display an image obtained by the image capturing by the first image capturing unit or the second image capturing unit;
a detection unit configured to detect a touch operation on a display screen of the display unit; and
a display control unit configured to control display on the display unit.

5. The electronic device according to claim 4, wherein the control unit performs control to, in response to a pinch-in or pinch-out touch operation on a live view image displayed on the display unit, change an angle of view of the image obtained by the image capturing by the first image capturing unit or the second image capturing unit.

6. The electronic device according to claim 4, wherein the display control unit performs control to, during the image capturing by the second image capturing unit, display a first display item for switching between the first image capturing and the second image capturing, together with a live view image obtained by the image capturing on the display unit.

7. The electronic device according to claim 5,
wherein the display control unit displays a second display item for changing the angle of view of the image obtained by the image capturing by the first image capturing unit or the second image capturing unit, together with a live view image obtained by the image capturing by the first image capturing unit or the second image capturing unit, and
wherein in response to a touch operation on the second display item, the control unit switches a lens used for image capturing and performs an electronic zoom process based on a touch position of the touch operation, thereby performing control to change the angle of view of the image obtained by the image capturing by the first image capturing unit or the second image capturing unit.

8. The electronic device according to claim 4, wherein the display unit is provided on the second surface.

9. The electronic device according to claim 1, wherein the first image capturing unit performs third image capturing using a third lens and fourth image capturing using a fourth lens having a wider angle of view than an angle of view of the third lens.

10. The electronic device according to claim 1, wherein the electronic device is a smartphone.

11. A method for controlling an electronic device including a first image capturing unit configured to capture an image using a lens placed on a first surface, and a second image capturing unit configured to capture an image using a lens placed on a second surface, the second image capturing unit being configured to switch to first image capturing using a first lens and second image capturing using a second lens having a wider angle of view than an angle of view of the first lens, the method comprising:
performing control to, during the image capturing by the second image capturing unit, in response to a user operation for changing from a still image capturing mode to a moving image capturing mode, switch to the moving image capturing mode and also switch from the first image capturing using the first lens to the second image capturing using the second lens.

12. A non-transitory computer-readable storage medium that stores a program for causing a computer to function as the units of the electronic device according to claim 1.

* * * * *